(12) United States Patent
Mitchell et al.

(10) Patent No.: US 8,717,095 B2
(45) Date of Patent: May 6, 2014

(54) CHOPPER CIRCUITRY OPERABLE IN A HIGH TEMPERATURE ENVIRONMENT OF A TURBINE ENGINE

(75) Inventors: David J. Mitchell, Oviedo, FL (US); Jie Yang, Fayetteville, AR (US); Roberto Marcelo Schupbach, Fayetteville, AR (US); John R. Fraley, Fayetteville, AR (US); Cora Schillig, Orlando, FL (US); Bryon Western, Fayetteville, AR (US)

(73) Assignee: Siemens Energy, Inc., Orlando, FL (US)

( * ) Notice: Subject to any disclaimer, the term of this patent is extended or adjusted under 35 U.S.C. 154(b) by 31 days.

(21) Appl. No.: 13/544,159

(22) Filed: Jul. 9, 2012

(65) Prior Publication Data

US 2014/0009222 A1   Jan. 9, 2014

(51) Int. Cl.
*H03F 1/02*   (2006.01)

(52) U.S. Cl.
USPC ............................................................ 330/9

(58) Field of Classification Search
USPC ........ 330/9, 51, 250, 255, 262, 269; 327/124, 327/307
See application file for complete search history.

(56) References Cited

U.S. PATENT DOCUMENTS

| | | | |
|---|---|---|---|
| 6,788,136 B2 * | 9/2004 | McGrath | 330/9 |
| 7,132,883 B2 | 11/2006 | Huijsing et al. | |
| 7,315,204 B2 * | 1/2008 | Seven | 330/51 |
| 7,696,817 B1 | 4/2010 | Boucher et al. | |
| 7,795,960 B2 * | 9/2010 | Lyden et al. | 330/9 |
| 8,023,269 B2 | 9/2011 | Mitchell et al. | |
| 8,033,722 B2 | 10/2011 | Kulkarni et al. | |
| 8,092,080 B2 | 1/2012 | Mitchell et al. | |
| 2009/0121896 A1 | 5/2009 | Mitchell et al. | |
| 2010/0039289 A1 | 2/2010 | Mitchell et al. | |
| 2010/0039290 A1 | 2/2010 | Mitchell et al. | |

OTHER PUBLICATIONS

Patil, "Silicon Carbide JFet Integrated Circuit Technology for High-Temperature Sensors", Department of Electrical Engineering and Computer Science, Case Western Reserve University, May 2009, pp. 1-158 (pp. I-XX are cover page and table of contents), Cleveland, OH.

Neudeck et al, "Extreme temperature 6H-SiC JFET integrated circuit technology", Phys. Status Solidi A 206, No. 10, pp. 2329-2345 (2009) / DOI 10.1002/pssa.200925188, Cleveland, OH.

Tomana et al., "A Hybrid Silicon Carbide Differential Amplifier for 350° C. Operation", IEEE Transactions on Components, Hybrids, and Manufacturing Technology, vol. 16, No. 5, Aug. 1993, pp. 536-542, Auburn, AL.

(Continued)

*Primary Examiner* — Khanh V Nguyen

(57) ABSTRACT

Chopper circuitry may be adapted to operate in a high-temperature environment of a turbine. A first semiconductor switch (122) may have a first terminal coupled to receive a first output signal from a first leg (148) of a differential amplifier (150). A second switch (128) may have a first terminal coupled thru a first resistive element (R1) to a second terminal of the first semiconductor switch. The first terminal of the second semiconductor switch may be coupled to receive thru a second resistive element (R2) a second output signal from a second leg (152) of the amplifier. Switches (122,128) may be responsive to a switching control signal to respective gate terminals of the switches to supply an output signal, which alternates in correspondence with a frequency of the switching control signal from a first amplitude level to a second amplitude level, which effectively provides a doubling amplification factor.

22 Claims, 4 Drawing Sheets

(56) References Cited

OTHER PUBLICATIONS

Yang et al, "An All Silicon Carbide High Temperature (450+ ° C.) High Voltage Gain AC Coupled Differential Amplifier", Materials Science Forum vols. 679-680 (2011) pp. 746-749, Mar. 28, 2011 at www.scientific.net © (2011) Trans Tech Publications, Switzerland, doi: 10.4028.

Neudeck, "Silicon Carbide Integrated Circuit Fabricated and Electrically Operated for 2000 hr at 500 ° C.", http://www.grc.nasa.gov/WWW/RT/2007/Inst-Cnt/17-RIS-neudeck.html, pp. 1-4, Nov. 7, 2008, Ohio Aerospace Institute (OAI) Brook Park, OH.

Seitz, "Designing with Thermocouples", Technology edge, © National Semiconductor Corporation 2009, Application Note AN-1952, pp. 1-3, Santa Clara, CA.

* cited by examiner

US 8,717,095 B2

CHOPPER CIRCUITRY OPERABLE IN A HIGH TEMPERATURE ENVIRONMENT OF A TURBINE ENGINE

FIELD OF THE INVENTION

The present invention is generally related to electronic circuits, and more particularly, to circuitry, which may be adapted to operate in a high temperature environment of a turbine engine.

BACKGROUND OF THE INVENTION

Turbine engines, such as gas turbine engines, may be used in a variety of applications, such as driving an electric generator in a power generating plant or propelling a ship or an aircraft. Firing temperatures of modern gas turbine engines continue to increase in response to the demand for higher combustion efficiency.

It may be desirable to use circuitry, such as may be used in a wireless telemetry system, to monitor operational parameters of the engine. For example, to monitor operating temperatures of components of the turbine, such as a turbine blade, or to monitor operational stresses placed upon such components during operation of the engine. Aspects of the present invention offer improvements in connection with such a circuitry.

BRIEF DESCRIPTION OF THE DRAWINGS

The invention is explained in the following description in view of the drawings that show.

DETAILED DESCRIPTION OF THE INVENTION

Example embodiments of the present invention may be directed to electronic circuitry, which, in one example application, may be used in an internal combustion engine, such as a turbine engine, instrumented with a telemetry system. This example application may allow transmitting sensor data from a movable component, such as a rotatable turbine engine blade, having certain electronic circuitry, which, for example, may operate in an environment having a temperature exceeding approximately 300° C.

For purposes of the disclosure herein, the term "high temperature" environment without additional qualification may refer to any operating environment, such as that within portions of a turbine engine, having a maximum operating temperature exceeding approximately 300° C. It will be appreciated that aspects of the present invention are not necessarily limited to a high temperature environment, since circuitry embodying aspects of the present invention may be used equally effective in a non-high temperature environment.

Figure 1:
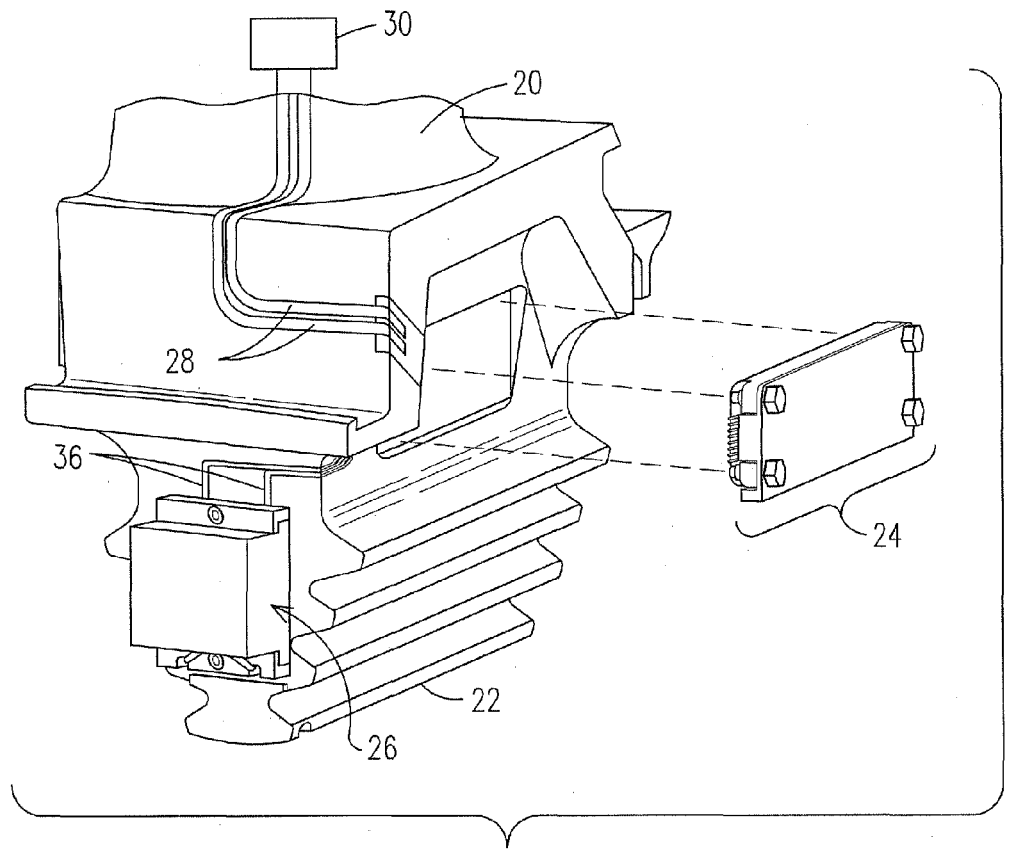
FIG. 1 is a partial isometric view of an exemplary turbine blade including electronic circuitry, which may be used by a wireless telemetry system to monitor operational parameters of the blade.

FIG. 1 illustrates a turbine blade 20 (fragmentarily illustrated), as may be instrumented with an example telemetry system, which may include a wireless telemetry transmitter assembly 24 and an antenna assembly 26. Lead lines or connectors 28 may extend from one or more sensors, such as sensor 30, to telemetry transmitter assembly 24, which may be mounted proximate a blade root 22 and may include various telemetry transmitter circuitry. Lead lines 28 may route electronic data signals from sensor 30 to telemetry transmitter assembly 24, where the signals may be processed by a processor. Further lead lines or electrical connectors 36 may be used for routing electronic data signals from telemetry transmitter circuitry to antenna assembly 26.

Figure 2:
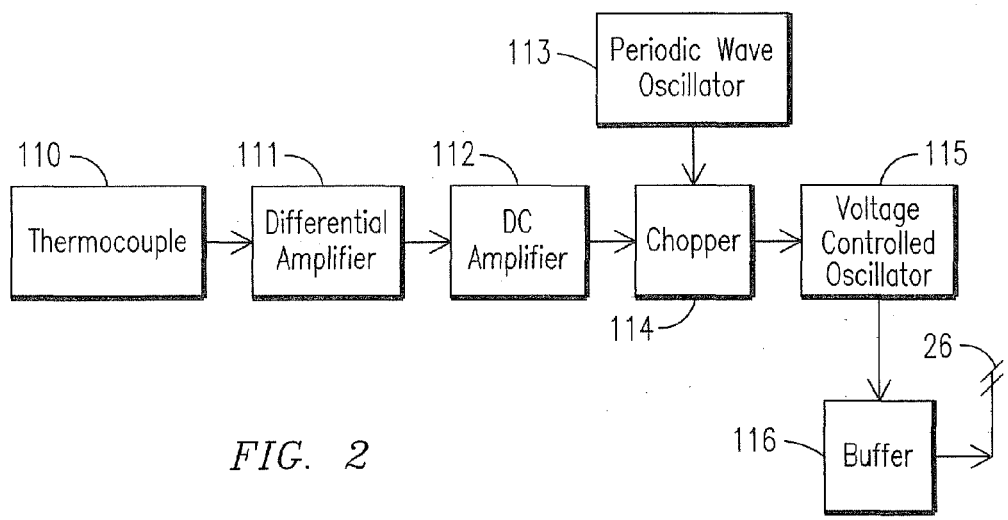
FIG. 2 is a block diagram of an example thermocouple circuitry, which may be used by the telemetry system, and which may benefit from chopper circuitry embodying aspects of the present invention.

FIG. 2 illustrates a block diagram of an example thermocouple circuitry, which may be used in a turbine component (e.g., turbine blade 20 (FIG. 1)) instrumented with a telemetry system. A signal indicative of the temperature of a measured turbine component may be sensed by a thermocouple 110, which signal may be coupled to a differential amplifier 111. The output of the differential amplifier 111 may be coupled to a direct current (DC) amplifier 112. The output of amplifier 112 and the output of a periodic wave oscillator 113 (e.g., a square wave generator) may be coupled as inputs of chopper circuitry 114.

Figure 3:
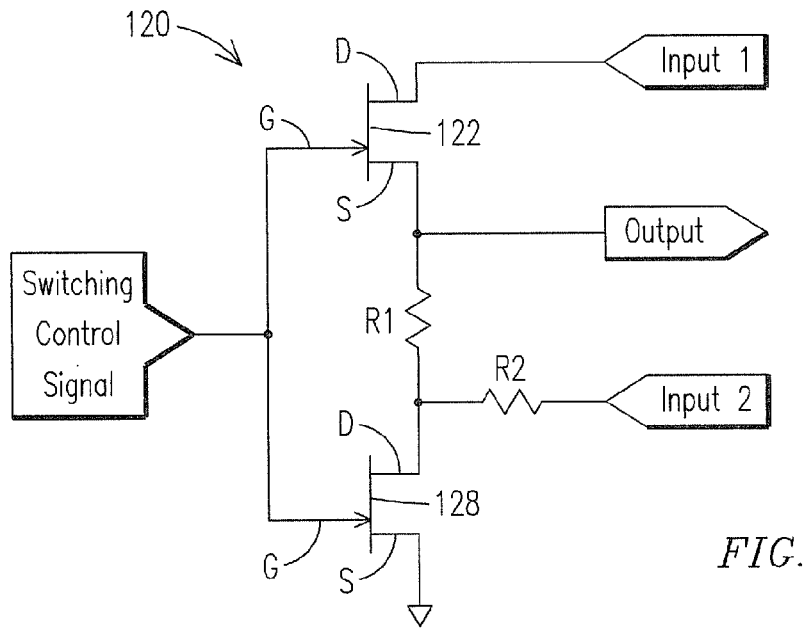
FIG. 3 is a schematic representation of one example embodiment of chopper circuitry embodying aspects of the present invention.
Figure 5:
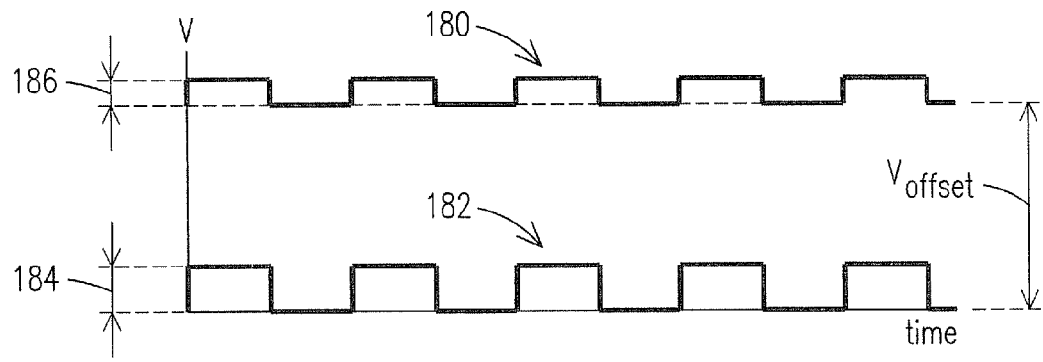
FIG. 5 is a plot of example waveforms, which may be used to visually conceptualize certain operational advantages of chopper circuitry embodying aspects of the present invention relative to conventional chopper circuitry.
Figure 4:
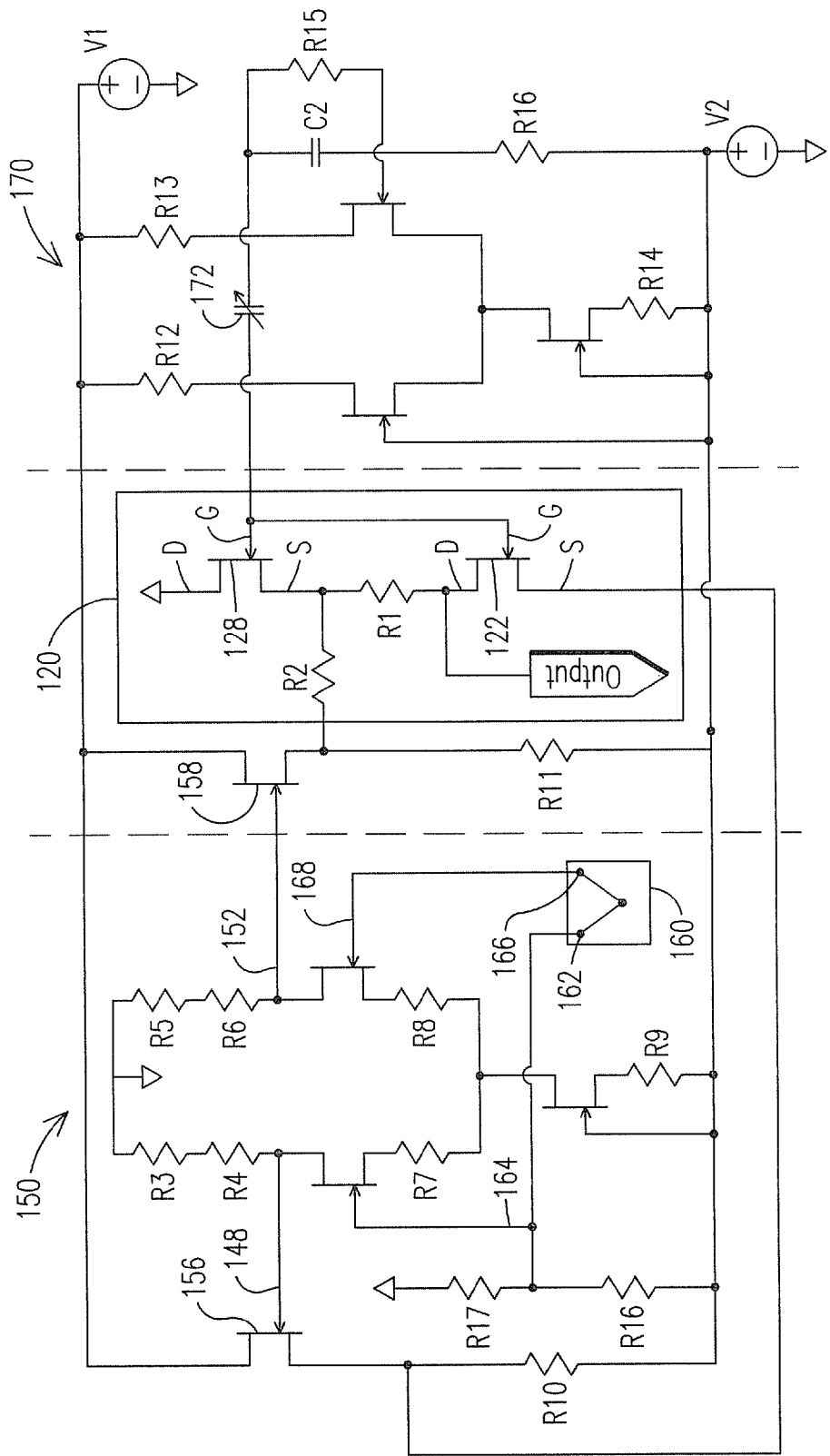
FIG. 4 is a schematic representation of chopper circuitry embodying aspects of the present invention, as may be integrated in one example thermocouple circuitry.

FIGS. 3-5 and related description below will provide details of chopper circuitry, embodying aspects of the present invention, which chopper circuitry, in one example application, may be used in thermocouple circuitry, as exemplarily illustrated in FIG. 2. It will be appreciated that such example application should not be construed in a limiting sense being that chopper circuitry embodying aspects of the present invention may be used in other applications.

Returning to FIG. 2, the output of chopper 114 may be coupled to the input of a voltage controlled oscillator 115. The output of chopper 114 in one example embodiment may be a periodic wave signal, (e.g., square wave signal) the amplitude of which may be representative of the sensed temperature of the measured turbine component and the frequency of which may be used to compensate the sensed temperature relative to a local temperature of the thermocouple circuitry. This periodic signal may be buffered by a buffer 116 and coupled to antenna 26 for transmission to an external receiver (not shown), which may be tuned to the carrier frequency.

FIG. 3 is a schematic representation of one example embodiment of chopper circuitry 120 (also shown in FIG. 4) embodying aspects of the present invention. Chopper circuitry 120 may include a first semiconductor switch 122 having a first terminal (e.g., a drain terminal (D) as labeled in FIG. 3, or a source terminal (S) as labeled in FIG. 4) coupled to receive (e.g., Input1 in FIG. 3) a first output signal from a first leg 148 of a differential amplifier 150 (FIG. 4). This first output signal from differential amplifier 150 may be provided with suitable signal conditioning (e.g., impedance matching) by way of a voltage follower transistor 156.

A second semiconductor switch 128 has a first terminal (e.g., drain terminal (D) as labeled in FIG. 3, or a source terminal (S) as labeled in FIG. 4) coupled by way of a first resistive element R1 to a second terminal of the first semiconductor switch (e.g., a source terminal (S) as labeled in FIG. 3, or a drain terminal (D) as labeled in FIG. 4). In one example embodiment, semiconductor switches 122, 128 may be junction gate field-effect transistor (JFET) switches and may comprise a respective high-temperature, wide bandgap material, such as SiC, AlN, GaN, AlGaN, GaAs, GaP, InP, AlGaAs, AlGaP, AlInGaP, and GaAsAlN.

The first terminal of the second semiconductor switch 128 (e.g., drain terminal (D) as labeled in FIG. 3, or source terminal (S) as labeled in FIG. 4) may be coupled to receive (e.g., Input2 in FIG. 3) by way of a second resistive element R2 a second output signal from a second leg 152 of differential amplifier 150 (FIG. 4). Similar to the first output signal, this second output signal from differential amplifier 150 may also be provided with suitable signal conditioning (e.g., impedance matching) by way of a voltage follower transistor 158. In one example embodiment, the first and the second resistive elements R1, R2 may comprise approximately equal resistance values. That is, equal resistance values, but for standard manufacturing tolerances or nominal deviations, as will be readily understood by one skilled in the art.

The first and the second semiconductor switches 122 and 128 may be responsive to a switching control signal, as labeled in FIG. 3. The switching control signal may be applied in parallel circuit to respective gate terminals (G) of the first and the second semiconductor switches 122 and 128. The switching control signal may generated by a periodic wave oscillator 170 (FIG. 4), which in one example embodiment may be configured as a relaxation type RC oscillator.

The second terminal of the first switch 122 (e.g., source terminal S as labeled in FIG. 3, or drain terminal D as labeled in FIG. 4) supplies an output signal (labeled Output in FIGS. 3 and 4) comprising a periodically, alternating current (AC) signal, (e.g., square wave signal) which alternates in correspondence with a frequency of the switching control signal from a first amplitude level corresponding to a level of the first output signal of the differential amplifier 150 to a second amplitude level corresponding to a level of the second output signal of differential amplifier 150. A second terminal of second semiconductor switch 128 may be electrically grounded, (e.g., source terminal S as shown in FIG. 3, or drain terminal D as shown in FIG. 4).

As shown in FIG. 4, a thermocouple 160 may have a first junction 162 electrically coupled to a first input terminal 164 of differential amplifier 150. Thermocouple 160 may have a second junction 166 electrically coupled to a second input terminal 168 of differential amplifier 150 to supply a voltage differential indicative of the sensed temperature.

Figure 6:
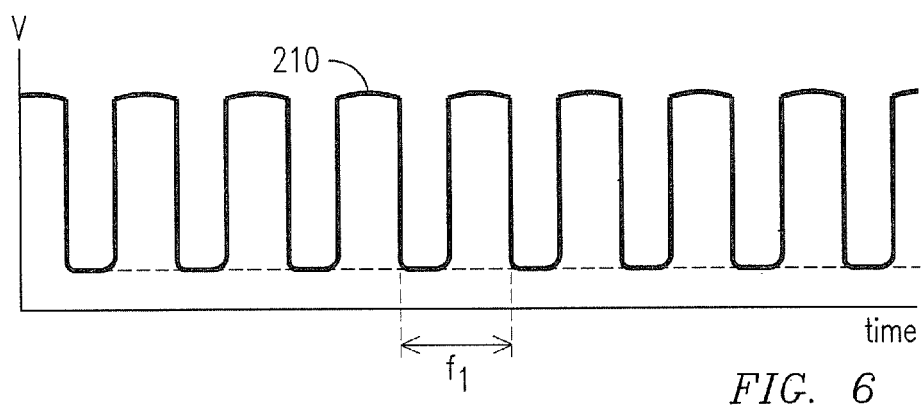
FIG. 6 is a plot illustrating an example output of the periodic wave generator (switching control signal for the chopper circuitry) at room temperature.
Figure 7:
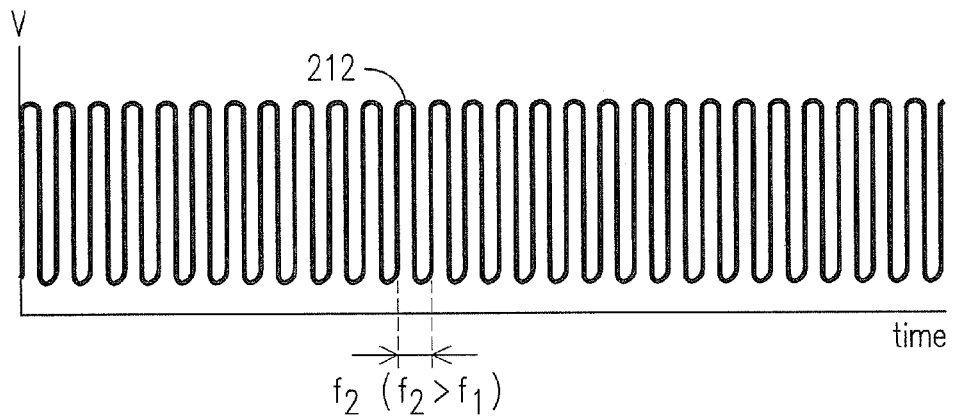
FIG. 7 is plot illustrating an example output of the periodic wave generator (switching control signal for the chopper circuitry) at an example elevated temperature relative to room temperature.
Figure 8:
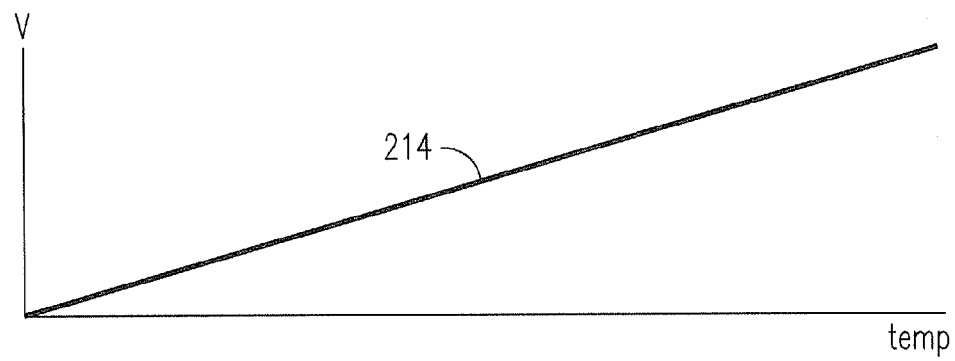
FIG. 8 is a plot illustrating an example output voltage variation of an example thermocouple as a function of temperature.
Figure 9:
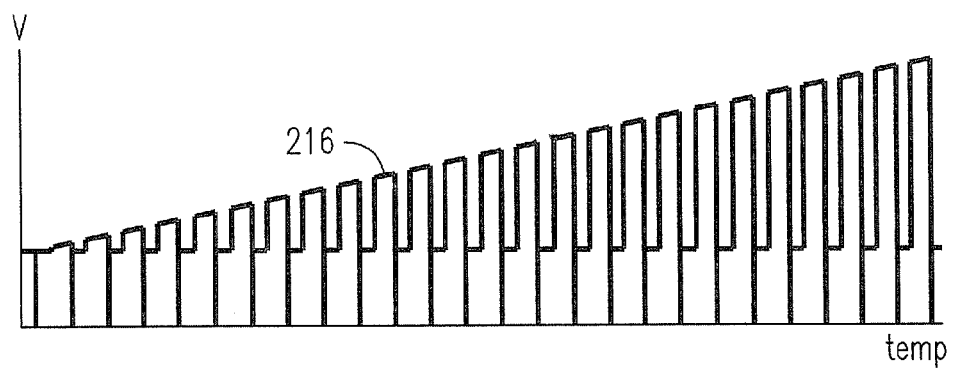
FIG. 9 is a plot illustrating an example output signal of chopper circuitry, which in one example embodiment may comprise amplitude information indicative of temperature sensed by the thermocouple, which may be referenced relative to a local temperature of the thermocouple circuitry based on the frequency of the switching control signal for the chopper circuitry.

The periodic wave output signal of oscillator 170 (i.e., switching control signal) may have a frequency determined by a temperature-dependent circuit element, such as capacitor 172 or a resistor. That is, its capacitance (or resistance) predictably changes with temperature changes. Accordingly, in one example embodiment, the local temperature of the thermocouple circuitry may be encoded into the switching control signal. For example, see FIG. 6, where waveform 210 may represent an output waveform at room temperature of oscillator 170; and also see FIG. 7 where waveform 212 may represent an output waveform of same oscillator 170 at an elevated temperature relative to room temperature. Waveform 214 in FIG. 8 may represent an example thermocouple output voltage variation as a function of temperature. Waveform 216 in FIG. 9 may represent the output of chopper circuitry 120, whose amplitude in one example embodiment may be proportional to the temperature sensed by thermocouple 110 and whose frequency may be proportional to the local temperature of the thermocouple circuitry. Thus, in one example embodiment, the output signal of chopper circuitry 120 may contain information indicative of temperature sensed by the thermocouple plus information of local temperature of the thermocouple circuitry, which may be used for temperature compensation purposes, as would be readily understood by one skilled in the art. The output signal of chopper circuitry 120 may then be applied to voltage controlled oscillator 115 (FIG. 2).

FIG. 5 shows example waveforms, which may be used to visually appreciate at least some of the advantages, which result from chopper circuitry embodying aspects of the present invention compared to conventional chopper circuitry, where the chopper circuitry is generally coupled to just one of the legs of the differential amplifier, in lieu of the two legs of the differential amplifier. Let us presume an example DC offset voltage of 1 V and let us further presume the information signal may have an example amplitude of 0.1 volt at a given leg of the differential amplifier. In the case of conventional chopper circuitry, the output at the given leg would be referenced to ground (the other leg of the differential amplifier may be electrically floating), and thus one must contend with a relatively small amplitude information signal (e.g., 0.1 V) relative to the DC offset voltage (e.g., 1 V). See waveform 180 in FIG. 5.

Compare the foregoing result with chopper circuitry embodying aspects of the present invention, where the chopper circuitry is coupled to both legs of the differential amplifier. In this case, because the signal at each leg of the differential amplifier is essentially phase-shifted by 180° relative to one another, the DC offset voltage would be essentially canceled and the amplitude of the information signal would be doubled. See waveform 182 in FIG. 5. In this case, a voltage swing 184 comprises a value approximately twice the voltage differential 186 (e.g., 0.1 V), which would be obtained with a conventional chopper circuitry connected just to one of the legs of the differential amplifier.

In operation, chopper circuitry embodying aspects of the present invention, where the respective output signals from the two legs of the differential amplifier are utilized, may be effective to doubling the amplitude gain provided by the chopper circuitry. It will be further appreciated that chopper circuitry embodying aspects of the present invention may be conducive to substantially reducing the DC offset, which otherwise could be introduced by the differential amplifier and this in turn leads to reduction of an undesired AC component, which would be generated by the chopper due to the DC offset from the differential amplifier. It will also be appreciated that chopper circuitry embodying aspects of the present invention may also be conducive to reducing the influences of temperature shifts and voltage variation in view of the utilization of the two legs of the differential amplifier. Additionally, chopper circuitry embodying aspects of the present invention may effectively increase the dynamic range of the sensing system, as the reduced unwanted AC component is replaced just by the signal containing the sensed information.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A circuitry adapted to operate in a high temperature environment of a turbine engine, the circuitry comprising:
    a sensing element disposed on a component of the turbine engine to sense a parameter of the component and provide a voltage differential indicative of the sensed parameter;
    a differential amplifier having a first input terminal and a second input terminal respectively coupled to the sensing element to receive the voltage differential indicative of the sensed parameter; and
    a chopper circuitry coupled to the differential amplifier and comprising:
        a first semiconductor switch having a first terminal coupled to receive a first output signal from a first leg of the differential amplifier; and
        a second semiconductor switch having a first terminal coupled by way of a first resistive element to a second terminal of the first semiconductor switch, the first terminal of the second semiconductor switch coupled to receive by way of a second resistive element a second output signal from a second leg of said differential amplifier, wherein the first and the second semiconductor switches are responsive to a switching control signal, the switching control signal being applied in parallel circuit to respective gate terminals of the first and the second semiconductor switches, wherein the second terminal of the first switch supplies an output signal comprising an alternating current (AC) signal, which alternates in correspondence with a frequency of the switching control signal from a first amplitude level corresponding to a level of the first output signal of said differential amplifier to a second amplitude level corresponding to a level of the second output signal of said differential amplifier, wherein a second terminal of the second semiconductor switch is electrically grounded.

2. The circuitry of claim 1, wherein the respective first terminals of the first and the second semiconductor switches comprise respective drain terminals and the second terminals of the first and the second semiconductor switches comprise respective source terminals.

3. The circuitry of claim 1, wherein the respective first terminals of the first and the second semiconductor switches comprise respective source terminals and the second terminals of the first and the second semiconductor switches comprise respective drain terminals.

4. The circuitry of claim 1, wherein the first and the second semiconductor switches comprise respective junction gate field-effect transistor (JFET) switches.

5. The circuitry of claim 1, wherein the first and the second semiconductor switches comprise a respective high-temperature, wide bandgap material.

6. The circuitry of claim 5, wherein the high-temperature, wide bandgap material is selected from the group consisting of SiC, AlN, GaN, AlGaN, GaAs, GaP, InP, AlGaAs, AlGaP, AlInGaP, and GaAsAlN.

7. The circuitry of claim 1, wherein the sensing element comprises a thermocouple to sense a temperature of the component, and the voltage differential is indicative of the sensed temperature of the component.

8. The circuitry of claim 7, further comprising a periodic wave oscillator configured to generate the switching control signal, which comprises a periodic wave signal having a frequency indicative of a local temperature of the circuitry.

9. The circuitry of claim 8, wherein a difference between the first amplitude level and the second amplitude level comprises a value approximately up to twice the voltage differential indicative of the sensed temperature of the component.

10. The circuitry of claim 1, wherein the first and the second resistive elements comprise approximately equal resistance values.

11. A telemetry system comprising the circuitry of claim 1.

12. A circuitry comprising:
    a first semiconductor switch having a first terminal coupled to receive a first output signal from a first leg of a differential amplifier;
    a second semiconductor switch having a first terminal coupled by way of a first resistive element to a second terminal of the first semiconductor switch, the first terminal of the second semiconductor switch coupled to receive by way of a second resistive element a second output signal from a second leg of said differential amplifier, wherein the first and the second semiconductor switches are responsive to a switching control signal, the switching control signal being applied in parallel circuit to respective gate terminals of the first and the second semiconductor switches, wherein the second terminal of the first switch supplies an output signal comprising an alternating current (AC) signal, which alternates in correspondence with a frequency of the switching control signal from a first amplitude level corresponding to a level of the first output signal of said differential amplifier to a second amplitude level corresponding to a level of the second output signal of said differential amplifier, wherein a second terminal of the second semiconductor switch is electrically grounded.

13. The circuitry of claim 12, wherein the respective first terminals of the first and the second semiconductor switches comprise respective drain terminals and the second terminals of the first and the second semiconductor switches comprise respective source terminals.

14. The circuitry of claim 12, wherein the respective first terminals of the first and the second semiconductor switches comprise respective source terminals and the second terminals of the first and the second semiconductor switches comprise respective drain terminals.

15. The circuitry of claim 12, wherein the first and the second semiconductor switches comprise respective junction gate field-effect transistor (JFET) switches.

16. The circuitry of claim 12, wherein the first and the second semiconductor switches comprise a respective high-temperature, wide bandgap material.

17. The circuitry of claim 16, wherein the high-temperature, wide bandgap material is selected from the group consisting of SiC, AlN, GaN, AlGaN, GaAs, GaP, InP, AlGaAs, AlGaP, AlInGaP, and GaAsAlN.

18. The circuitry of claim 12, further comprising a periodic wave oscillator configured to generate the switching control signal, which comprises a periodic wave signal having a frequency indicative of a local temperature of the circuitry.

19. The circuitry of claim 18, further comprising a thermocouple electrically coupled to a first input terminal and to a second input terminal of said differential amplifier to supply a voltage differential indicative of a sensed temperature.

20. The circuitry of claim 19, wherein a difference between the first amplitude level and the second amplitude comprises a value approximately up to twice the voltage differential indicative of the sensed temperature.

21. The circuitry of claim 12, wherein the first and the second resistive elements have approximately equal resistance values.

22. The circuitry of claim 19, adapted to operate in a high temperature environment of a turbine engine, the circuitry affixed to a rotatable component of the turbine engine to sense and configured to signal condition the voltage differential indicative of the sensed temperature of the rotatable component.

\* \* \* \* \*

UNITED STATES PATENT AND TRADEMARK OFFICE
CERTIFICATE OF CORRECTION

PATENT NO.         : 8,717,095 B2                           Page 1 of 1
APPLICATION NO.    : 13/544159
DATED              : May 6, 2014
INVENTOR(S)        : David J. Mitchell et al.

It is certified that error appears in the above-identified patent and that said Letters Patent is hereby corrected as shown below:

Title Page

(73) Assignees should read: Siemens Energy, Inc., Orlando, FL (US)
                               Arkansas Power Electronics International, Inc., Fayetteville, AR (US)

Signed and Sealed this
Tenth Day of May, 2016

Michelle K. Lee
*Director of the United States Patent and Trademark Office*